(12) United States Patent
Rowntree et al.

(10) Patent No.: US 10,736,347 B2
(45) Date of Patent: Aug. 11, 2020

(54) CONTROL SYSTEM FOR A LIVESTOCK FEED MIXER

(71) Applicant: KUHN NORTH AMERICA, INC., Brodhead, WI (US)

(72) Inventors: Bryan Rowntree, Brodhead, WI (US); Jacob Veeder, Browntown, WI (US); Rodney Zimmerman, New Glarus, WI (US); Aaron Wepner, Brodhead, WI (US); William Bassett, Brodhead, WI (US); Thomas J. Hoffman, Sun Prairie, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 0 days.

(21) Appl. No.: 16/681,648

(22) Filed: Nov. 12, 2019

(65) Prior Publication Data

US 2020/0077694 A1    Mar. 12, 2020

Related U.S. Application Data

(63) Continuation of application No. 15/457,196, filed on Mar. 13, 2017, now Pat. No. 10,499,680.

(51) Int. Cl.
| | | |
|---|---|---|
| *A23N 17/00* | (2006.01) | |
| *B01F 7/08* | (2006.01) | |
| *B01F 7/24* | (2006.01) | |
| *B01F 15/00* | (2006.01) | |
| *B01F 13/00* | (2006.01) | |

(52) U.S. Cl.
CPC ............ *A23N 17/007* (2013.01); *B01F 7/081* (2013.01); *B01F 7/241* (2013.01); *B01F 13/0037* (2013.01); *B01F 15/00201* (2013.01); *B01F 15/00253* (2013.01); *B01F 15/00389* (2013.01)

(58) Field of Classification Search
CPC .................................................... A23N 17/007
USPC ........................................ 366/297, 314, 603
See application file for complete search history.

(56) References Cited

U.S. PATENT DOCUMENTS

| | | | | |
|---|---|---|---|---|
| 6,758,426 B2* | 7/2004 | Have | ...................... | A01K 5/004 241/101.2 |
| 8,850,910 B1* | 10/2014 | Have | ........................ | F16H 3/66 241/32 |
| 10,499,680 B2* | 12/2019 | Rowntree | ............... | B01F 7/081 |

(Continued)

FOREIGN PATENT DOCUMENTS

WO    2018-145198 A1    8/2018

*Primary Examiner* — David L Sorkin
(74) *Attorney, Agent, or Firm* — Oblon, McClelland, Maier & Neustadt, L.L.P.

(57) ABSTRACT

A control system for mixing materials having a container to receive the materials, agitators, a driveline to drive the agitators at an output speed with an output torque, an power source to provide an input speed with an input torque, a continuously variable transmission that connects the driveline and the power source, and an electronic control unit configured to adjust a speed ratio of the continuously variable transmission to provide a linear relationship between the input torque and the output torque with a slope, when the input torque is below a control input threshold, and to follow a corrected linear relationship between the input torque and the output torque with a corrected slope smaller than the slope when the input torque is above the control input threshold.

8 Claims, 9 Drawing Sheets

(56) References Cited

U.S. PATENT DOCUMENTS

2005/0172741 A1    8/2005   Van Der Plas
2016/0129408 A1    5/2016   Peeters

* cited by examiner

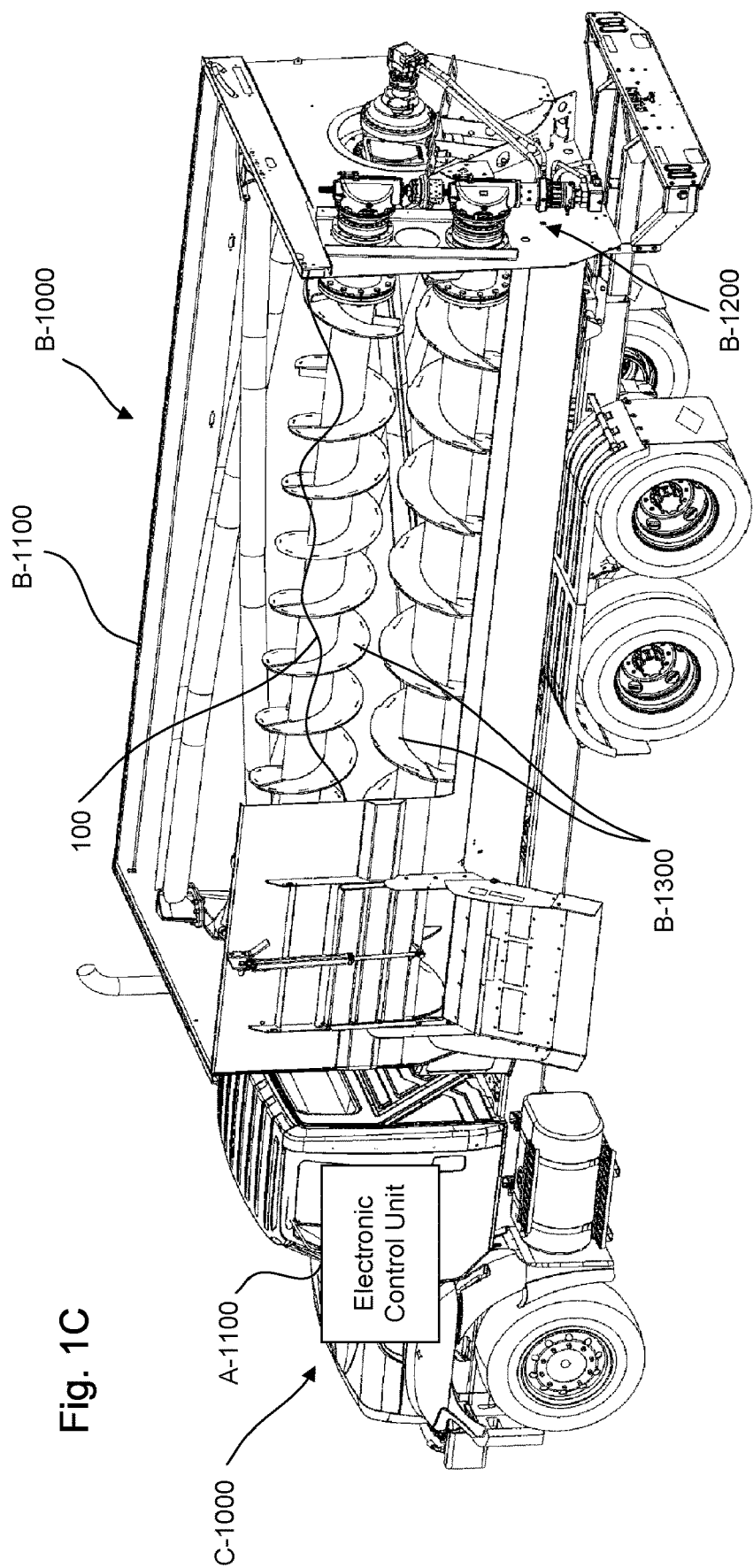

CONTROL SYSTEM FOR A LIVESTOCK FEED MIXER

CROSS-REFERENCE TO RELATED APPLICATIONS

This application is a continuation of U.S. application Ser. No. 15/457,196 filed Mar. 13, 2017, the entire contents of which is incorporated herein by reference.

BACKGROUND

Field of the Disclosure

The present disclosure relates to control system for mixers. More precisely, the present application relates to torque control applied to livestock feed mixers.

Description of the Related Art

In today's livestock management, feeding a large number of animals precisely and rapidly is essential.

Such a demand in livestock feeding can be addressed with agricultural machinery that can receive large quantities of feed materials, e.g., hay and grains, mix uniformly these feed materials to obtain a homogenous feed mixture, transport and distribute this feed mixture to the livestock.

To this end, conventional livestock feed mixers that utilize an external source of power, e.g., a tractor, to mix the feed materials have been adopted. In such conventional livestock feed mixers, power requirements can be important and varied as physical characteristics of the feed materials, e.g., viscosity, mass, or volume, as well as mixing characteristics, mixing homogeneity or mixing time, can vary depending on a plurality of characteristics, e.g., livestock size and type, or weather conditions.

Although such conventional livestock feed mixers are widely used, they present important drawbacks in managing power from the power source to the conventional livestock feed mixer. Notably, when more and more feed materials are added to the conventional livestock feed mixers, the power required by the conventional livestock feed mixer can quickly reach and even exceed the power limit of the power source. As a result, mixing has to be quickly and abruptly reduced or even stopped.

Thus, a control system for livestock feed mixer solving the aforementioned problem of power management is desired.

SUMMARY

Accordingly, the object of the present disclosure is to provide a system and a method to control a livestock feed mixer which overcomes the above-mentioned limitations.

The control system of the present disclosure extends the range of available torque provided by the power source by incrementally adjusting, via a continuously variable transmission, a speed ratio between the power source and the livestock feed mixer to delay the point at which the power source is overcome by the torque demand of the livestock feed mixer.

In one non-limiting illustrative example, a control system for a livestock feed mixer is presented. The control system for a livestock feed mixer includes a container to receive the materials, agitators to mix the materials in the container, a driveline to drive the agitators at an output speed with an output torque, a power source to provide an input speed with an input torque, a continuously variable transmission that connects the driveline and the power source, and an electronic control unit to prevent the external source from being overcome by the torque required by the agitators and to extend the supply of the input torque, wherein the electronic control unit is configured to adjust a speed ratio of the continuously variable transmission to provide a linear relationship between the input torque and the output torque with a slope when the input torque is below a control input threshold, and to follow a corrected linear relationship between the input torque and the output torque with a corrected slope smaller than the slope when the input torque is above the control input threshold.

In another non-limiting illustrative example, a method to control torque of a livestock feed mixer is presented. The control system includes a container to receive the materials, agitators to mix the materials in the container, a driveline to drive the agitators at an output speed with an output torque below a maximum output torque, a power source to provide an input speed with an input torque below a maximum input torque, a continuously variable transmission to connect the driveline to the power source and provide a speed ratio between the input speed and the output speed, and an electronic control unit configured to control the input torque. The method to control torque includes inputting, via software instructions executed by the electronic control unit, a value of an output target speed for the agitators, acquiring, via a speed sensor and software instructions executed by the electronic control unit, a value of the input speed, adjusting, via software instructions executed by the electronic control unit, a value of the speed ratio to provide a linear relationship between the input torque and the output torque with a slope based on the ratio of the value of the output target speed and the value of the input speed, acquiring, via a torque sensor and software instructions executed by the electronic control unit, a value of the output torque, calculating, via software instructions executed by the electronic control unit, a value of the input torque based on the linear relationship, detecting, via software instructions executed by the electronic control unit, if a control of the input torque is required based on the value of the input torque, calculating, via software instructions executed by the electronic control unit, a corrected linear relationship between the input torque and the output torque with a corrected slope based on the maximum input torque and the maximum output torque, determining, via software instructions executed by the electronic control unit, if the control of the input torque is feasible based on the slope and the corrected slope, and adjusting, via software instructions executed by the electronic control unit, a corrected value of the speed ratio to follow the corrected linear relationship.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1C is a cross sectional view of a livestock feed mixer powered by an power source and controlled by a control system in a third configuration, according to certain aspects of the disclosure;

DETAILED DESCRIPTION

Figure 1A:
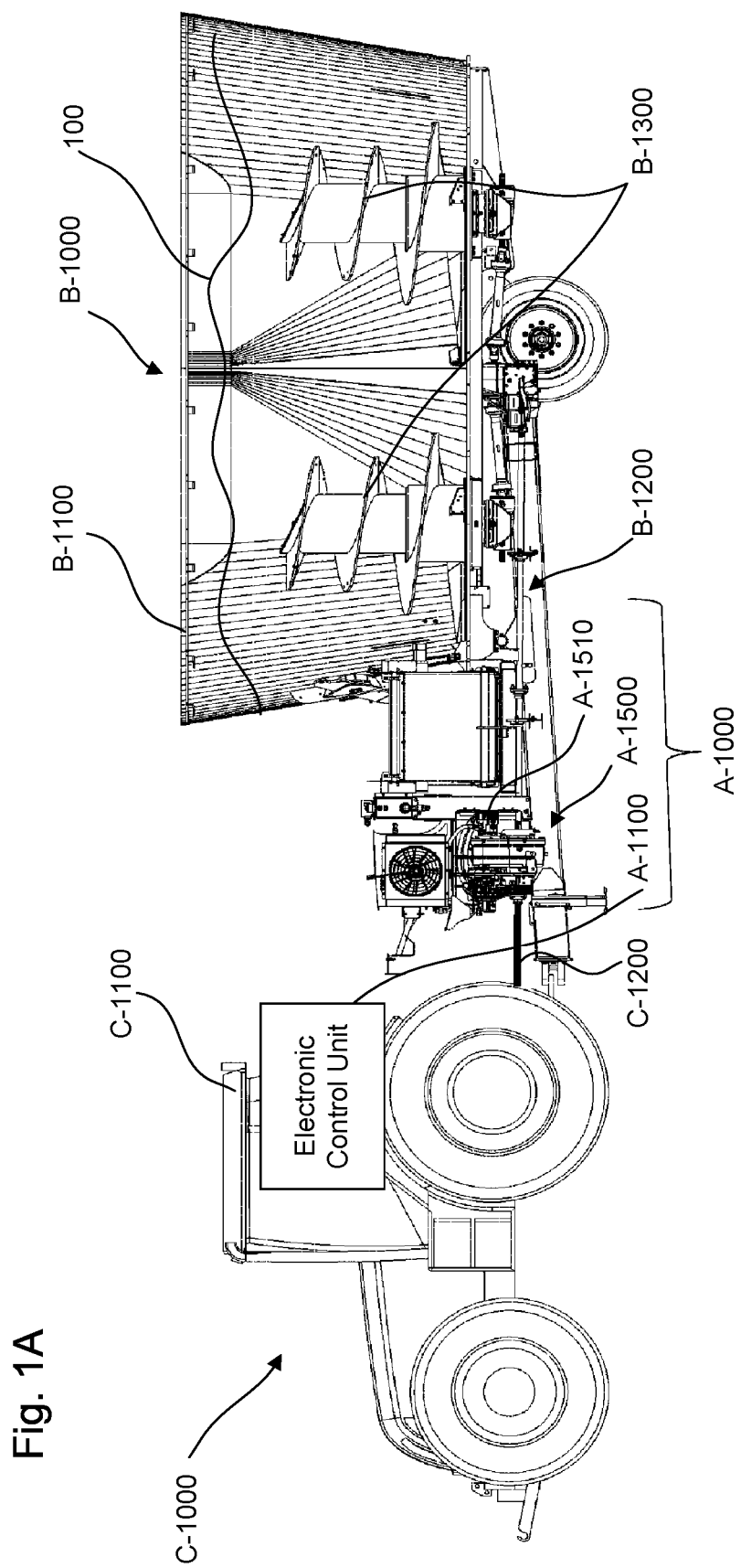
FIG. 1A is a cross sectional view of a livestock feed mixer powered by an power source and controlled by a control system in a first configuration, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
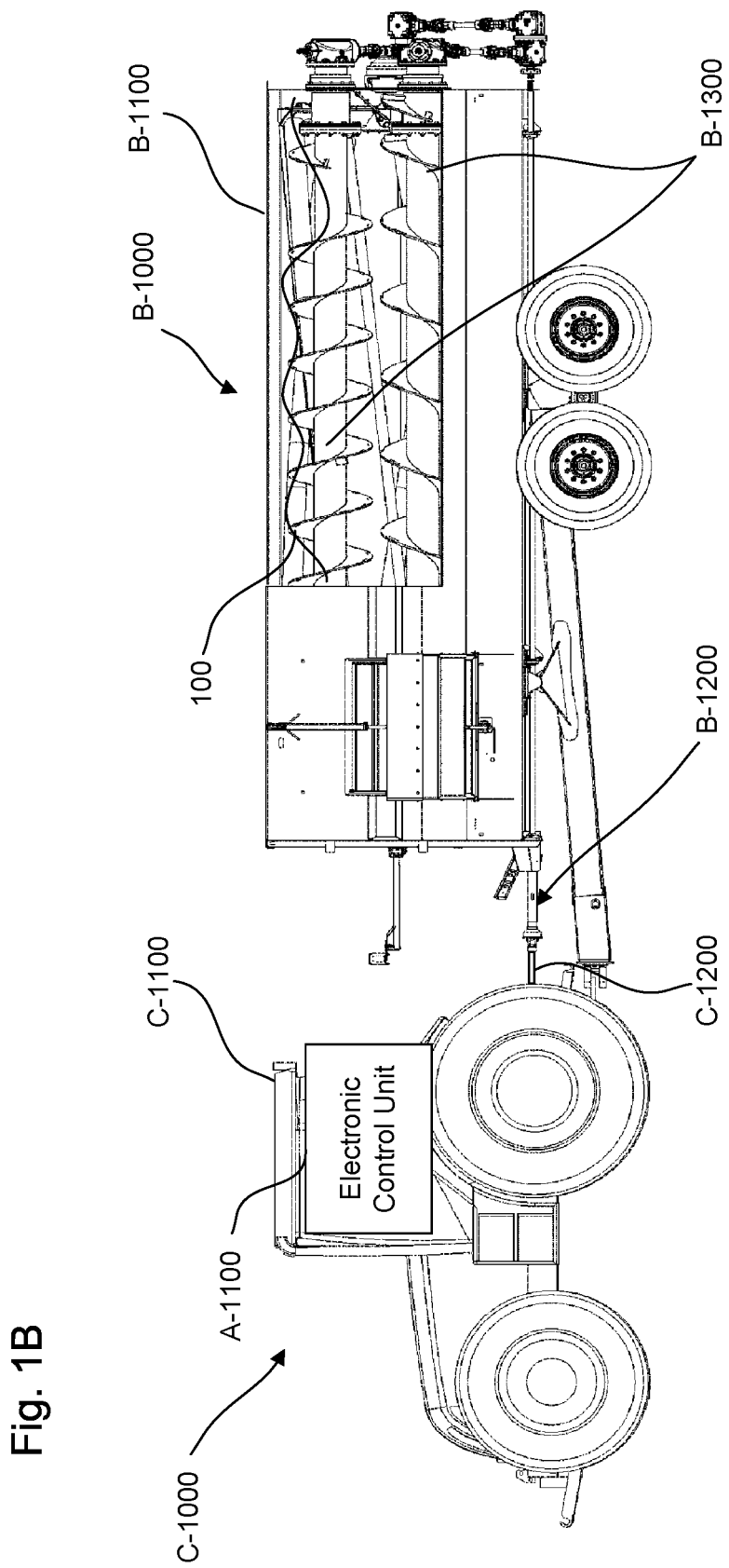
FIG. 1B is a cross sectional view of a livestock feed mixer powered by an power source and controlled by a control system in a second configuration, according to certain aspects of the disclosure.

FIGS. 1A-1C are cross sectional views of a livestock feed mixer B-1000 powered by a power source C-1000 and controlled by a control system A-1000 in a first configuration, a second configuration, and a third configuration, according to certain aspects of the disclosure.

The livestock feed mixer B-1000 includes a container B-1100 to receive materials 100, e.g., hay and/or grains, agitators B-1300, and a driveline B-1200 to transmit mechanical power from the power source C-1000 to the agitators B-1300.

The power source C-1000 can be a tractor C-1100 with a power take-off C-1200, as illustrated by first and second configurations in FIGS. 1A-1B, an internal combustion engine of a truck as illustrated by a third configuration in FIG. 1C, an electric motor, or any other type of source of power that can provide an input torque $T_{in}$.

The agitators B-1300 can be reels and/or augers placed substantially vertically, as illustrated in FIG. 1A, or placed substantially horizontally, as illustrated by the second and third configurations in FIGS. 1B-1C.

The control system A-1000 prevents the power source C-1000 from being overcome by the torque required by the livestock feed mixer B-1000 to mix the materials 100, e.g., stall, while extending the ability of the power source C-1000 to supply an increase demand of the input torque $T_{in}$ to the livestock feed mixer B-1000 due to mixing condition changes, e.g., addition of materials 100, in the livestock feed mixer B-1000.

Figure 2:
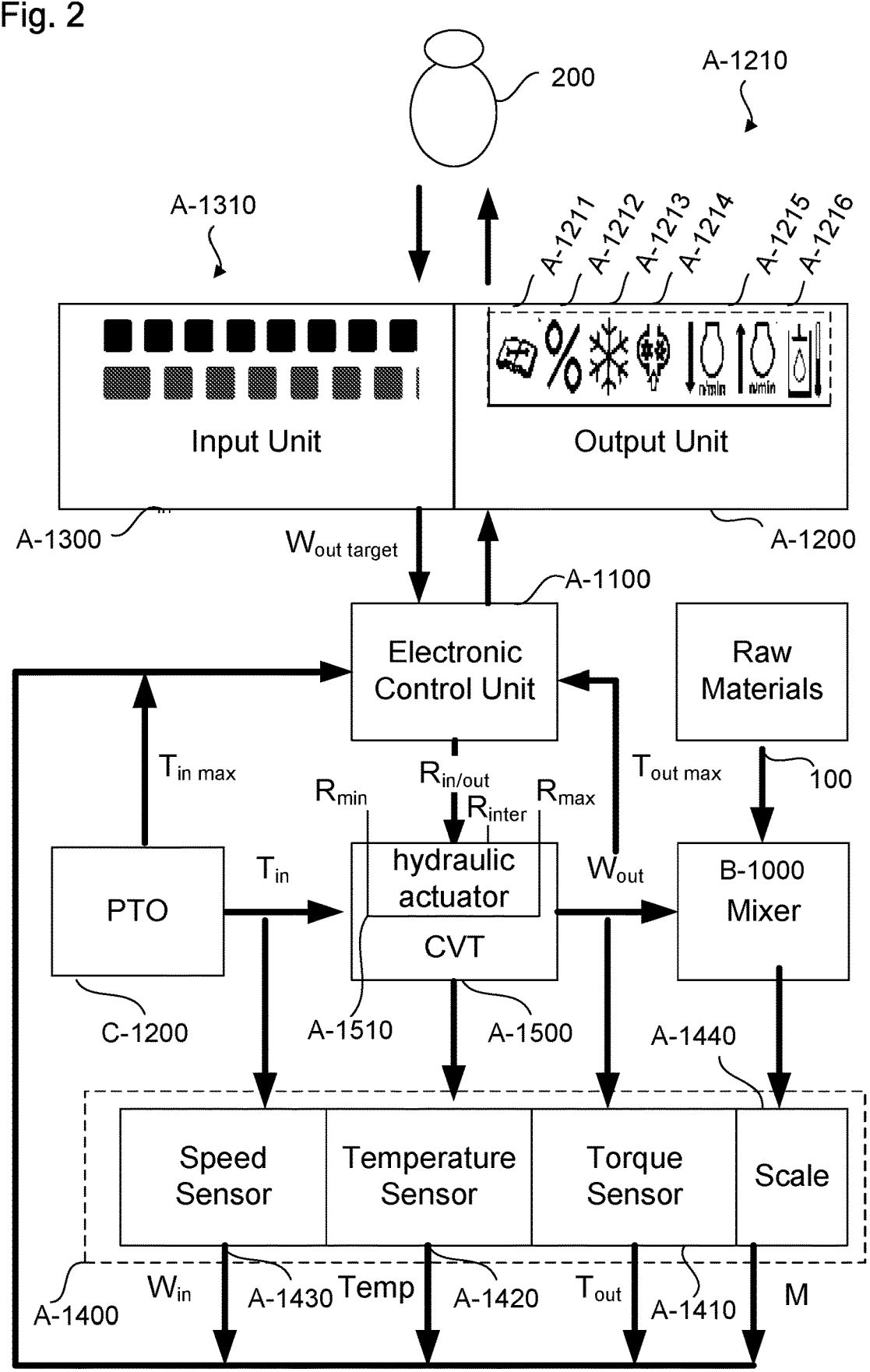
FIG. 2 is a schematic view of the control system, according to certain aspects of the disclosure.

FIG. 2 is a schematic view of the control system A-1000, according to certain aspects of the disclosure.

The control system A-1000 can include an electric control unit A-1100, an output unit A-1200 electronically connected to the electric control unit A-1100 to display key information to an operator 200, an input unit A-1300 electronically connected to the electric control unit A-1100 to receive input information from the operator 200, a continuously variable transmission A-1500 actuated by the electric control unit A-1100 and connecting the power take-off C-1200 of the power source C-1000 to the driveline B-1200 of the livestock feed mixer B-1000, and a plurality of sensors A-1400 to provide signals indicative of the characteristic parameters of the control system A-1000, e.g., speed, torque, pump/motor displacement, and/or temperature.

The continuously variable transmission A-1500 transmits an input torque $T_{in}$ from the power take-off C-1200 of the power source C-1000 to an output torque $T_{out}$ for the driveline B-1200 of the livestock feed mixer B-1000 and converts an input speed $W_{in}$ from the power take-off C-1200 into an output speed $W_{out}$ for the driveline B-1200 to actuate the agitators B-1300.

The continuously variable transmission A-1500 includes a hydraulic actuator A-1510 to adjust a speed ratio $R_{in/out}$ between the input speed $W_{in}$ and the output speed $W_{out}$.

The hydraulic actuator A-1510 can include a pump and motor mounted onto a hydrostatic loop that circulates a hydraulic fluid, e.g., oil, and provides variable flow of the hydraulic fluid. The hydraulic actuator A-1510 can adjust the speed ratio $R_{in/out}$ between a minimum speed ratio $R_{min}$ and a maximum speed ratio $R_{max}$ by varying the flow of the hydraulic fluid between a minimum flow $F_{min}$, corresponding to a full negative displacement $D_{min}$, and a maximum flow $F_{max}$, corresponding to a full positive displacement $D_{max}$.

The speed ratio $R_{in/out}$ can be adjusted by the electronic control unit A-1100 to provide values of the output speed $W_{out}$ that follows operator instructions entered through the input unit A-1300 or that follows software instructions executed by a processor A-1102 including processing circuitry inside the electronic control unit A-1100 to control the input torque $T_{in}$.

The continuously variable transmission A-1500 is characterized by a maximum output torque $T_{out\ max}$ above which the continuously variable transmission A-1500 may experience reduced life or failure. For example, the maximum output torque $T_{out\ max}$ can corresponds to a maximum hydraulic pressure of the hydraulic actuator A-1510. The maximum hydraulic pressure can be between 100 bar and 1000 bar, preferably between 300 bar and 500 bar which can correspond to a value of the maximum output torque $T_{out\ max}$ between 1020 Nm and 10200 Nm, and preferably between 3070 Nm and 5100 Nm.

The power take-off C-1200 is characterized by a maximum input torque $T_{in\ max}$ above which the power source C-1000 fails to provide necessary torque to mix the materials 100. For example, the maximum output torque $T_{out\ max}$ can be between 500 Nm and 5000 Nm, and preferably between 1000 Nm and 3000 Nm.

The plurality of sensors A-1400 can include a torque sensor A-1410, e.g., a hydraulic pressure sensor placed on the hydraulic actuator A-1510, to provide to the electronic control unit A-1100 torque signals indicative of values of the output torque $T_{out}$, a hydraulic fluid temperature sensor A-1420 to provide to the electronic control unit A-1100 temperature signals indicative of values of a temperature Temp of the continuously variable transmission A-1500, a speed sensor A-1430 to provide to the electronic control unit A-1100 speed signals indicative of values of the input speed $W_{in}$, and a scale A-1440 to provide to the electronic control unit A-1100 mass signals indicative of values of a mass M of materials 100 in the livestock feed mixer B-1000.

The output unit A-1200 can be configured to display the key information to the operator 200 via a status bar A-1210. The status bar A-1210 can include a service reminder icon A-1211, a load factor icon A-1212, a cold start icon A-1213, a motor speed warning icon A-1214, a decrease/increase speed icon A-1215, and an overheat icon A-1216.

The service reminder icon A-1211 can be configured to alert the operator 200 that a repair or a service is required. For example, the service reminder icon A-1211 can be displayed on the output unit A-1200 when a scheduled event, e.g., hydraulic fluid change, stored in a memory A-1104 and/or a database of the electric control unit A-1100, is due in a service predetermined period of time. For example, the service predetermined period of time can be between 10 hour and 5000 hours, and preferably between 50 hours and 2000 hours.

The load factor icon A-1212 can be configured to indicate to the operator 200 that the materials 100 received in the livestock feed mixer B-1000 generate a value of the output torque $T_{out}$ that is substantially close or above the maximum output torque $T_{out\ max}$.

The cold start icon A-1213 can be configured to indicate to the operator 200 that the continuously variable transmission A-1500 is warming up before transmitting the desired output speed $W_{out}$ to the driveline B-1200.

The motor speed warning icon A-1214 can be configured to indicate to the operator 200 that software instructions are executed by the processor A-1102 to automatically adjust values of the speed ratio $R_{in/out}$.

The decrease/increase speed icon A-1215 is configured to instruct the operator 200 to decrease or increase the input speed $W_{in}$ of the power take-off C-1200.

The overheat icon A-1216 is configured to alert the operator 200 that some elements of the control systems A-1000, e.g., hydraulic fluid of the continuously variable transmission A-1500, are reaching and/or exceeding thresholds.

The input unit A-1300 is configured to receive the input information from the operator 200 and transmits the input information to the electronic control unit A-1100. For example, the input system A-1300 can include push buttons, keyboard buttons, and/or touch screen sensitive icons A-1310 and the input information can include a value of an output target speed $W_{out\ target}$ for the driveline B-1200 of the livestock feed mixer B-1000, a value for the maximum input torque $T_{in\ max}$ available by the power source C-1000, a value of the minimum speed ratio $R_{min}$, a value of the maximum speed ratio $R_{max}$, and a value for the maximum output torque $T_{out\ max}$ that can be transmitted by the continuously variable transmission A-1500.

Alternatively, the values of the maximum input torque $T_{in\ max}$, the minimum speed ratio $R_{min}$, the maximum speed ratio $R_{max}$, the maximum output torque $T_{out\ max}$ can be selected from a list of default values stored in the memory A-1102 and/or database of the electric control unit A-1100.

Figure 3:
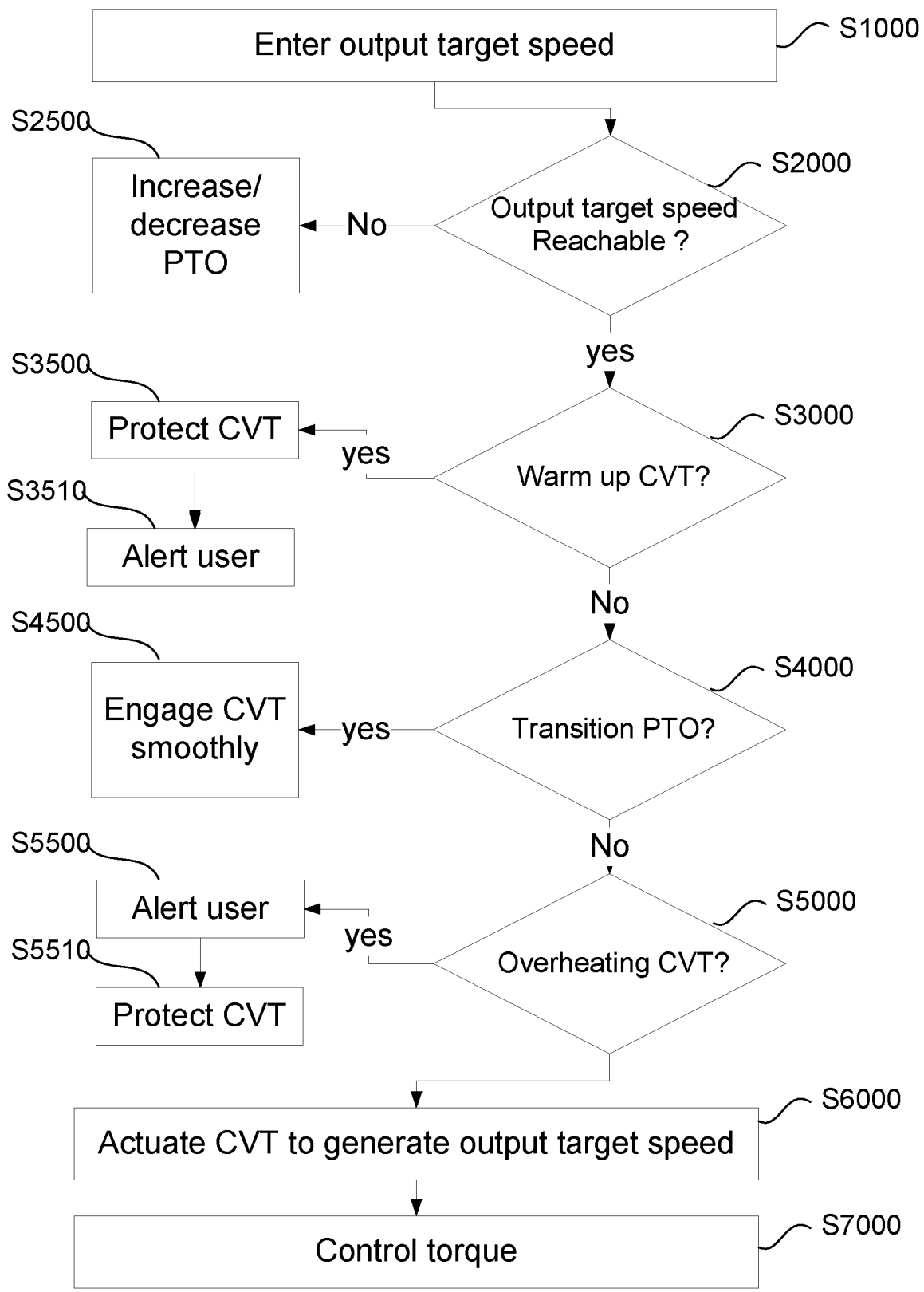
FIG. 3 is a flow chart of a method for operating the livestock feed mixer through the control system, according to certain aspects of the disclosure.

FIG. 3 is a flow chart of a method for operating the livestock feed mixer B-1000 through the control system A-1000, according to certain aspects of the disclosure.

In a step S1000, a value of the output target speed $W_{out\ target}$ is manually entered by the operator 200 via the input system A-1300 or automatically selected from the list of default values, via software instructions executed by the electronic control unit A-1100.

In a step S2000, it is determined if the value of the output target speed $W_{out\ target}$ entered in the step S1000 is reachable. The reachability of the value of the output target speed $W_{out\ target}$ can be determined with a value of the product between the input speed $W_{in}$ and the maximum speed ratio $R_{max}$ and a value of the product between the input speed $W_{in}$ and the minimum speed ratio $R_{min}$ that are measured and computed via the speed sensor A-1430 and through software instructions executed by the electronic control unit A-1100. The value of the output target speed $W_{out\ target}$ is determined as unreachable if the value of the product between the input speed $W_{in}$ and the maximum speed ratio $R_{max}$ is inferior to the value of the output target speed $W_{out\ target}$ or if the value of the product between the input speed $W_{in}$ and the minimum speed ratio $R_{min}$ is superior to the value of the output target speed $W_{out\ target}$.

If the value of the output target speed $W_{out\ target}$ is determined as reachable, the process goes to a step S3000. Otherwise, the process goes to a step S2500.

In the step S2500, the decrease/increase speed icon A-1215 is displayed on the output unit A-1200 by the electronic control unit A-1100 to instruct the operator 200 to increase or decrease the input speed $W_{in}$ of the power take-off C-1200.

In the step S3000, it is determined if a warm up of the continuously variable transmission A-1500 is required. The warm up requirement for the continuously variable transmission A-1500 is determined based on a value of the temperature Temp of the continuously variable transmission A-1500 that is measured via the hydraulic fluid temperature sensor A-1420 and the electric control unit A-1100. Through software instructions executed by the electronic control unit A-1100, the value of the temperature Temp is compared to a temperature threshold $Temp_{min}$ and the warm up requirement for the continuously variable transmission A-1500 is detected if the value of the temperature Temp is below the temperature threshold $Temp_{min}$.

If the warm up requirement for the continuously variable transmission A-1500 is detected the process goes to a step S3500. Otherwise, the process goes to a step S4000.

In the step S3500, the process is configured to protect the continuously variable transmission A-1500 by preventing the continuously variable transmission A-1500 from reaching the maximum speed ratio $R_{max}$ independently of the output target speed $W_{out\ target}$ entered by the operator 200 in step S1000. Through software instructions executed by the electronic control unit A-1100, the hydraulic actuator A-1510 actuates the continuously variable transmission A-1500 between the minimum speed ratio $R_{min}$ and an intermediary speed ratio $R_{inter}$ lower than the maximum speed ratio $R_{max}$. The intermediary speed ratio $R_{inter}$ can depend on the value of the temperature Temp of the hydraulic fluid measured in the step S3000. For example, the intermediary speed ratio $R_{inter}$ can be constrained between a minimum speed ratio $R_{inter\ min}$ when the temperature Temp is below a predetermined minimum temperature threshold $Temp_0$, e.g., when the continuously variable transmission A-1500 experienced a cold start, and a maximum speed ratio $R_{inter\ max}$ when the temperature Temp is above the predetermined minimum temperature threshold $Temp_0$. The minimum speed ratio $R_{inter\ min}$ can correspond to the minimum flow $F_{min}$ being substantially zero or negligible.

In a step S3510, the process is configured to alert the operator 200 that the livestock feed mixer B-1000 is warming up. Through software instructions executed by the electronic control unit A-1100, the cold start icon A-1213 is displayed on the output unit A-1200 by the electronic control unit A-1100 to indicate to the operator 200 that the output target speed $W_{out}$ target may not be reached immediately.

In the step S4000, it is detected if the power take-off C-1200 is in a transient mode, e.g., a start-up mode or an accelerating mode. The transient mode of the power take-off C-1200 is detected based on a variation value of the input speed $W_{in}$ that is measured via the speed sensor A-1430 and the electronic control unit A-1100. Through software instructions executed by the electronic control unit A-1100, the variation value of the input speed $W_{in}$ is compared to a variation threshold $\Delta W$ and the transient mode is detected if the variation value of the input speed $W_{in}$ is above the variation threshold $\Delta W$.

If the transient mode for the continuously variable transmission A-1500 is detected the process goes to a step S4500. Otherwise, the process goes to a step S5000.

In the step S4500, the process is configured to protect the control system A-1000 and smooth the engagement between the power source C-1000 and the livestock feed mixer B-1000. Through software instructions executed by the electronic control unit A-1100, the hydraulic actuator A-1510 actuates the continuously variable transmission A-1500 to smoothly transition from the minimum speed ratio $R_{min}$ up to a speed ratio corresponding to the output target speed $W_{out\ target}$. For example, the hydraulic actuator A-1510 can maintain the continuously variable transmission A-1500 at the minimum speed ratio $R_{min}$ for a predetermined period of time such that the driveline B-1200 and the agitators B-1300 have a constant speed and then the hydraulic actuator A-1510 can gradually increase the speed ratio $R_{in/out}$ up to a value corresponding to the output target speed $W_{out\ target}$. The predetermined period of time can be between 0.1 second and 100 seconds and preferably between 1 second and 10 seconds.

In addition, in the step S4500, the cold start icon A-1213 is displayed on the output unit A-1200 by the electronic control unit A-1100 to indicate to the operator 200 that the output target speed $W_{out\ target}$ may not be reached immediately.

In the step S5000, it is detected if the continuously variable transmission A-1500 is overheating. The overheating of the continuously variable transmission A-1500 is detected based on the value of the temperature Temp of the hydraulic fluid measured in the step S3000. Through software instructions executed by the electronic control unit A-1100 the value of the temperature Temp of the hydraulic fluid is compared to a first overheating temperature threshold $Temp_{max1}$ and the overheating of the continuously variable transmission A-1500 is detected if the value of the temperature Temp of the hydraulic fluid is above the first overheating temperature threshold $Temp_{max1}$.

If the overheating of the continuously variable transmission A-1500 is detected the process goes to a step S5500. Otherwise, the process goes to a step S6000.

In the step S5500, the process is configured to alert the operator 200 that the system needs to be stopped. Through software instructions executed by the electronic control unit A-1100, the output unit A-1200 displays warnings to the operator 200 to indicate that continuously variable transmission A-1500 is overheating. In one example, for a value of the temperature Temp of the hydraulic fluid above the first overheating temperature threshold $Temp_{max1}$ but below a second overheating temperature threshold $Temp_{max2}$ that is higher than the first overheating temperature threshold $Temp_{max1}$, the output unit A-1200 can display the overheat icon A-1216 in a solid appearance and a first warning message to alert the operator 200 of the overheating of the continuously variable transmission A-1500, e.g., "Hydraulic Temperature Warning". In another example, for a value of the temperature Temp of the hydraulic fluid above the second overheating temperature threshold $Temp_{max2}$, the electronic control units A-1100 can display the overheat icon A-1216 in a flashing appearance and a second warning message to instruct the operator 200 to stop the livestock feed mixer B-1000, e.g., "Hydraulic Temperature Warning-Stop Machine Immediately."

In a step S5510, the process is configured to protect the continuously variable transmission A-1500 by minimizing the hydraulic flow to prevent overheating and/or damaging the livestock feed mixer B-1000. Through software instructions executed by the electronic control unit A-1100, the hydraulic actuator A-1510 actuates the continuously variable transmission A-1500 to reduce and/or minimize the hydraulic flow. For example, the hydraulic actuator A-1510 can actuate the continuously variable transmission A-1500 to have a value of the speed ratio $R_{in/out}$ that is substantially equal to the minimum speed ratio $R_{min}$.

In the step S6000, via software instructions executed by the electronic control unit A-1100, the hydraulic actuator A-1510 actuates the continuously variable transmission A-1500 to have a value of the speed ratio $R_{in/out}$ that corresponds to the output target speed $W_{out\ target}$ entered in the step S1000. Then the process goes to a step S7000.

In the step S7000, the process is configured to prevent the power source C-1000 to be overpowered, e.g., stall, while enabling the power source C-1000 to continuously increase the input torque $T_{in}$ to match an increase of the output torque $T_{out}$ as the materials 100 are added to the livestock feed mixer B-1000.

The step S7000, is further described in the following paragraphs and in FIG. 4.

The process can be configured to have an alternative step to protect the control system A-1000 when the livestock feed mixer B-1000 is started. Through software instructions executed by the electronic control unit A-1100, the hydraulic actuator A-1510 can set the continuously variable transmission A-1500 at a high default displacement $D_{OH}$ during a predetermined period of time and then the hydraulic actuator A-1510 can gradually adjust the high default displacement $D_{OH}$ to reach a value of the speed ratio $R_{in/out}$ corresponding to the output target speed $W_{out\ target}$. The high default displacement $D_{OH}$ can be between 5% and 100%, and preferably between 20% and 100%, of the full negative displacement $D_{min}$ while the predetermined time can be between 3 and 10 seconds.

In addition, the process can be configured to have the alternative step overridden by crucial steps. For example, if in the step S3000 the warm up requirement for the continuously variable transmission A-1500 is detected the process can override the alternative step with the step S3500.

Figure 4:
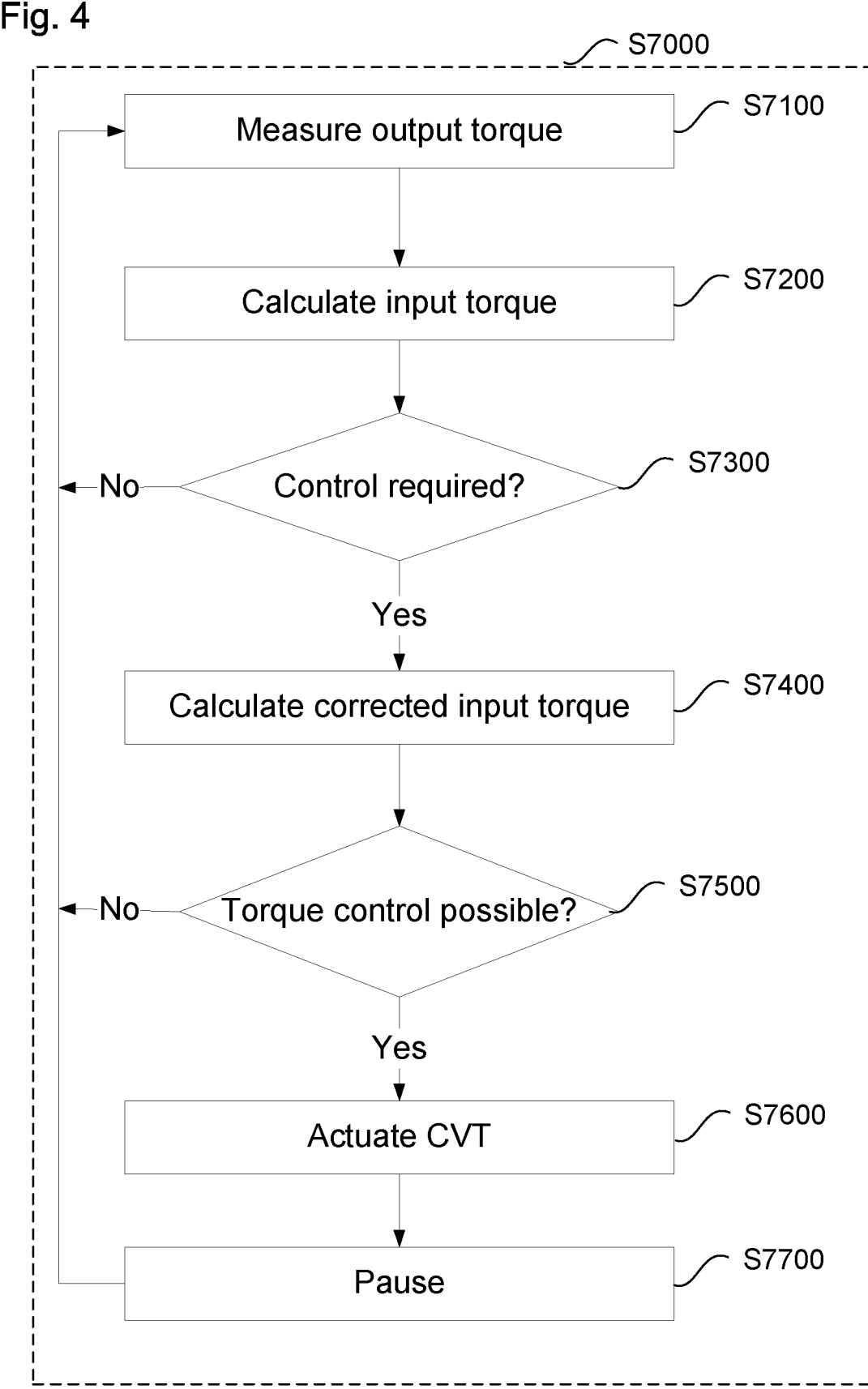
FIG. 4 is a flow chart of a method for controlling a torque input of the livestock feed mixer, according to certain aspects of the disclosure.

FIG. 4 is a flow chart of a method for controlling the input torque $T_{in}$ of the livestock feed mixer B-1000 through the control system A-1000, according to certain aspects of the disclosure.

In a step S7100, a value of the output torque $T_{out}$ is measured through the torque sensor A-1410 and via software instructions executed by the processor A-1102 including processing circuitry inside the electronic control unit A-1100. The electronic control unit A-1100 can be configured to receive torque signals, e.g., hydraulic pressure signals, generated by the torque sensor A-1410 and to convert the torque signals into the value of the output torque $T_{out}$ required to mix the materials 100.

In a step S7200, a value of the input torque $T_{in}$ is calculated based on the value of the output torque $T_{out}$ measured in step S7100 and the value of the speed ratio $R_{in/out}$ that corresponds to the output target speed $W_{out\ target}$ entered in the step S1000. For example, the value of the input torque $T_{in}$ can be linearly dependent on the value of output torque $T_{out}$ as $T_{in}=M*T_{out}$, where a slope M is equal to the inverse of the value speed ratio $R_{in/out}$.

In a step S7300, it is determined if a torque control is required through the value of the input torque $T_{in}$ and via software instructions executed by the electronic control unit A-1100. The torque control requirement is detected if the value of the input torque $T_{in}$ calculated in the step S7200 is higher than a control input threshold $T_{in\ control}$. For example, the control input threshold $T_{in\ control}$ can have a value between 70% and 100%, and preferably between 80% and 90%, of a value of the maximum input torque $T_{in\ max}$.

If the value of the input torque $T_{in}$ is higher than the control input threshold $T_{in\ control}$ the torque control requirement is detected and the process goes to a step S7400. Otherwise, the process goes back to the step S7100.

In the step S7400, a corrected input torque $T_{in\ corrected}$ is calculated based on the value of the output torque $T_{out}$ via software instructions executed by the electronic control unit A-1100. For example, the corrected input torque $T_{in\ corrected}$ can be linearly dependent on the output torque $T_{out}$ as $T_{in\ corrected}=(M_C \cdot T_{out})+b$, where a corrected slope $M_c$ and a corrected intersection b verifies that the corrected input torque $T_{in\ corrected}$ is equal to the maximum input torque $T_{in\ max}$ when the output torque $T_{out}$ is equal to the maximum output torque $T_{out\ max}$ and the corrected input torque $T_{in\ corrected}$ is equal to the control input threshold $T_{in\ control}$ when the output torque $T_{out}$ is equal to the product between the control input threshold $T_{in\ control}$ and the speed ratio $R_{in/out}$ that corresponds to the output target speed $W_{out\ target}$.

In addition, in the step S7400, the load factor icon A-1212 can be displayed on the output unit A-1200 via software instructions executed by the processor A-1102 to indicate to the operator 200 that the materials 100 in the livestock feed mixer B-1000 generate a value of the output torque $T_{out}$ that is substantially close to the maximum output torque $T_{out\ max}$.

In a step S7500, it is determined if the torque control is possible based on the slope M and the corrected slope $M_c$ via software instructions executed by the electronic control unit A-1100. For example, the electronic control unit A-1100 can be configured to compare the slope M and the corrected slope $M_c$.

If the corrected slope $M_c$ is lower than the slope M, the torque control is determined as possible and the process goes to a step S7600. Otherwise, the process goes back to the step S7100.

In the step S7600, via software instructions executed by the electronic control unit A-1100, the hydraulic actuator A-1510 actuates the continuously variable transmission A-1500 to follow the linear dependence of the corrected input torque $T_{in\ corrected}$ with the output torque $T_{out}$ established in the step S7400. For example, the hydraulic actuator A-1510 can actuate the continuously variable transmission A-1500 to increase or decrease the value of the output speed $W_{out}$ by an predetermined increment $\delta W$. The predetermined increment $\delta W$ can be between 0.1% and 5%, and preferably between 0.5% and 2% of the output target speed $W_{out\ target}$.

In addition, in the step S7200, the motor speed warning icon A-1214 can be displayed on the output unit A-1200 via software instructions executed by the processor A-1102 to indicate to the operator 200 that the value of the speed ratio $R_{in/out}$ is not adjusted to provide the value of an output target speed $W_{out\ target}$.

In a step S7700, the process pauses during a predetermined standby period $T_{stb}$ sufficiently long such as the actuation of the continuously variable transmission A-1500 performed in the step S7600 is reflected on the agitators B-1300. For example, the predetermined standby period $T_{stb}$ can be between 0.1 second and 10 seconds, and preferably between 0.25 second and 0.75 second. Then, the process goes back to the step S7100.

Figure 5:
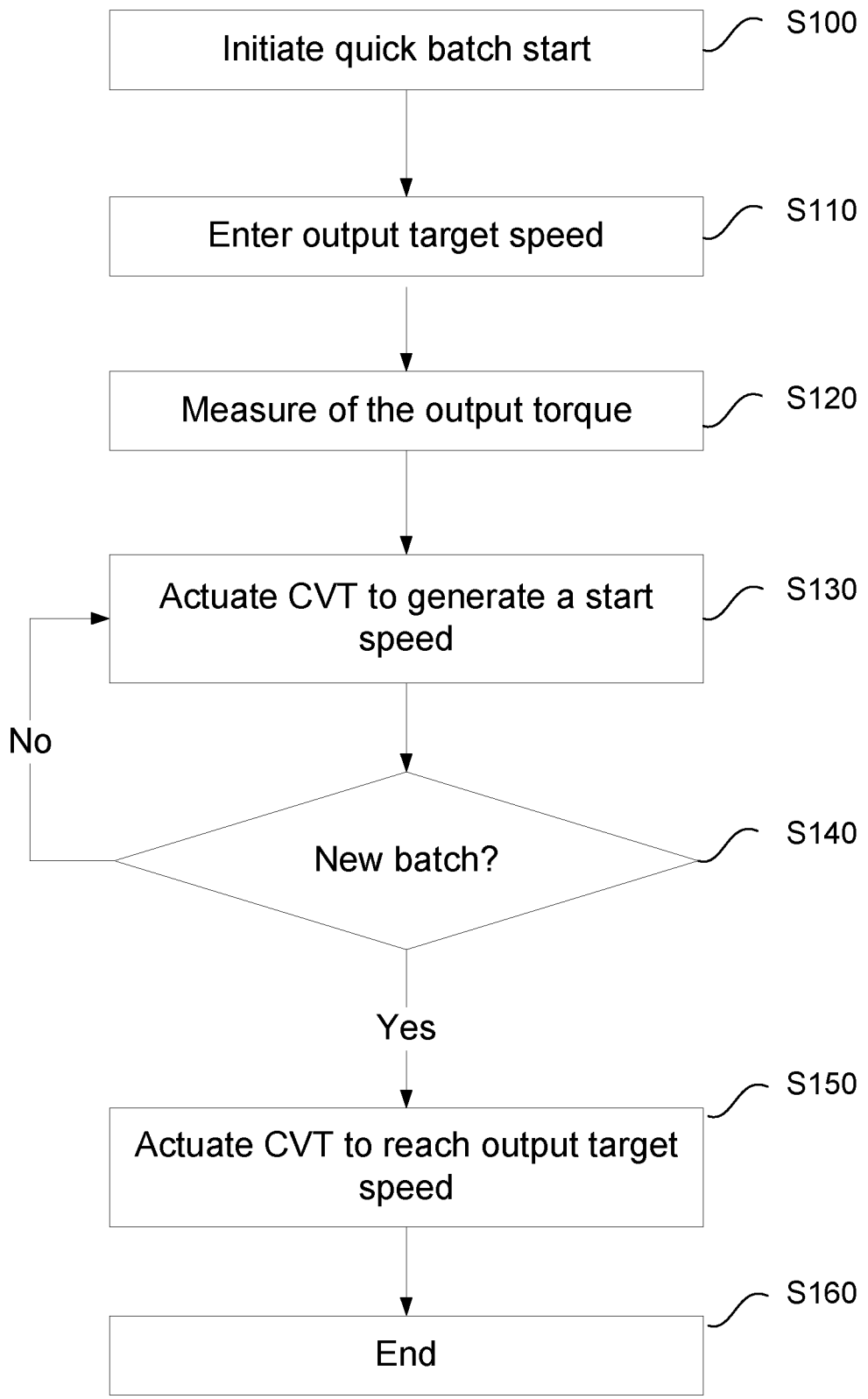
FIG. 5 is a flow chart of a method for a quick batch start process performed by the livestock feed mixer, according to certain aspects of the disclosure.

FIG. 5 is a flow chart of a method for a quick batch start process performed by the livestock feed mixer B-1000, according to certain aspects of the disclosure.

In a step S100, the quick batch start process is initiated. The quick batch start process can be initiated manually by the operator 200 via the input system A-1300, e.g., actuations of dedicated buttons and/or icons, and/or graphical user interface instructions, or by default, e.g., when the livestock feed mixer B-1000 is started, via software instructions executed by the electronic control unit A-1100.

In a step S110, a value of the output target speed $W_{out\ target}$ can be manually entered by the operator 200 via the input system A-1300 or automatically selected from the list of default values, via software instructions executed by the electronic control unit A-1100.

In a step S120, a value of the output torque $T_{out}$ is measured through the torque sensor A-1410 and via software instructions executed by the processor A-1102 including processing circuitry inside the electronic control unit A-1100. The electronic control unit A-1100 can be configured to receive torque signals, e.g., hydraulic pressure signals, generated by the torque sensor A-1410 and to convert the torque signals into the value of the output torque $T_{out}$ required to mix the materials 100.

In a step S130, via software instructions executed by the electronic control unit A-1100, the hydraulic actuator A-1510 actuates the continuously variable transmission A-1500 to rotate the agitators B-1300 with a start speed. The start speed value is lower than the value of the output target speed $W_{out\ target}$ entered in the step S110 to save energy and wear of the livestock feed mixer B-1000. For example, the start value can be between 30% and 80% of the value of the output target speed $W_{out\ target}$. The start speed values for different agitators of the livestock feed mixer can vary. A first agitator speed may be 30% and a second agitator may be 80%. The start speed of at least one agitator can be zero during this sequence as long as other agitators are rotating.

In a step S140, it is detected if a new batch of materials 100 is loaded into the livestock feed mixer B-1000. The detection of the loading of the new batch of materials 100 is performed by comparing the value of the output torque $T_{out}$ measured in the step S120 with an output torque start threshold value through software instructions executed by the electronic control unit A-1100. The output torque start threshold can correspond to a minimum torque value that the livestock feed mixer B-1000 generated.

If the value of the output torque $T_{out}$ is larger than output torque start threshold value the loading of a new batch of materials 100 is detected and the process goes to a step S150. Otherwise, the process goes back to the step S130.

In the step S150, via software instructions executed by the electronic control unit A-1100, the hydraulic actuator A-1510 actuates the continuously variable transmission A-1500 to rotate the agitators B-1300 with a speed corresponding to the value of the output target speed $W_{out\ target}$ entered in the step S110.

In a step S160, the quick batch start process is ended.

Figure 6:
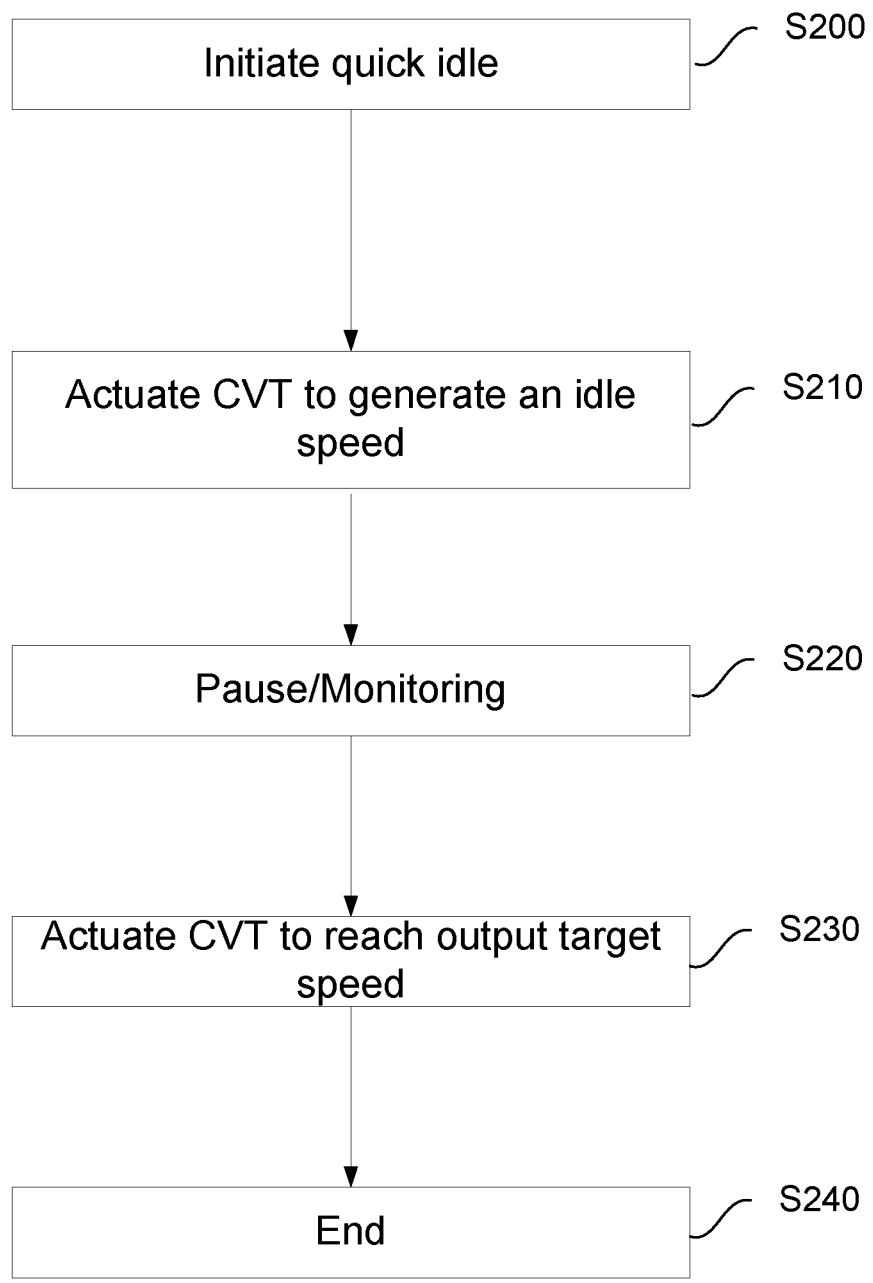
FIG. 6 is a flow chart of a method for a quick idle process performed by the livestock feed mixer, according to certain aspects of the disclosure.

FIG. 6 is a flow chart of a method for a quick idle process performed by the livestock feed mixer B-1000, according to certain aspects of the disclosure.

In a step S200, a quick idle process can be manually initiated by the operator 200 via the input system A-1300, e.g., actuations of a dedicated buttons, icons, and/or graphical user interface instructions.

In a step S210, via software instructions executed by the electronic control unit A-1100, the hydraulic actuator A-1510 actuates the continuously variable transmission A-1500 to rotate the agitators B-1300 with an idle speed value. The idle speed value is lower than the value of the output target speed $W_{out\ target}$ to stabilize the livestock feed mixer B-1000 and more precisely perform some operations.

The stabilization of the livestock mixer B-1000 can limit movement amplitudes of the materials M and enable the mass M of the materials 100 to be measured by the scale A-1440 with more accuracy e.g., with an accuracy below 10% and preferably below 5%.

In addition, the stabilization of the livestock mixer B-1000 can reduce the rate at which materials 100 are discharged from the livestock mixer B-1000, e.g., from 200 pounds per second to 5 pounds per second, and enable the operator 200 to more precisely discharge a desired quantity of materials 100.

For example, the idle speed value can be between 30% and 80% of the value of the output target speed $W_{out\ target}$. The idle speed values for different agitators of the livestock feed mixer can vary. A first agitator speed may be 30% and a second agitator may be 80%. The idle speed of at least one agitator can be zero during this sequence as long as other agitators are rotating.

In a step S220, the process pauses during a predetermined idling period $T_{idle}$. The predetermined idling period $T_{idle}$ is sufficiently long such that the scale A-1440 and the electronic control unit A-1100 can accurately measure the mass M of the materials 100 or to enable the operator 200 to precisely discharge the desired quantity of materials 100, and sufficiently short such that the livestock feed mixer B-1000 is not damaged by a proportionally high amount of torque resulting from a relative low value of the idle speed value, e.g., relative to the output target speed $W_{out\ target}$. For example, the predetermined idling period $T_{idle}$ can be between 1 second and 1 minute, and preferably between 15 seconds and 30 seconds. The step S220 may maintain the step 210, i.e., idling process, as long as a demand signal indicative of an idle demand is supplied by the operator 200 via the input system A-1300, e.g., actuations of a dedicated buttons, icons, and/or graphical user interface instructions, to the electronic control unit A-1100. However, if the demand signal is supplied for longer than a predetermined period of time $T_{manual\_idle}$ the step S210 is stopped and the process moves directly to the step S230. Otherwise, the process maintains the step S210. For example, the predetermined period of time $T_{manual\_idle}$ can be between 1 second and 60 seconds, and preferably between 15 seconds and 30 seconds.

In addition, the process may maintain the step S210 until an abnormal behavior of the idle process, e.g., high and/or rapid increase of the output torque $T_{out}$, is detected. For example, the abnormal behavior can be detected based on values of the output torque $T_{out}$ that are measured via the torque sensor A-1410 and the electronic control unit A-1100. Through software instructions executed by the electronic control unit A-1100, the values of the output torque $T_{out}$ can be compared to a torque threshold $T_{idle}$ and the abnormal behavior can be detected if values of the output torque $T_{out}$ are above the torque threshold $T_{idle}$. In another example, the abnormal behavior can be detected based on variation values of the output torque $T_{out}$ that are measured via the torque sensor A-1410 and the electronic control unit A-1100. Through software instructions executed by the electronic control unit A-1100, the variation values of the output torque $T_{out}$ can be compared to a variation torque threshold $\Delta T_{idle}$ and abnormal behavior of idling process can be detected if the variation values of the output torque $T_{out}$ are above the variation torque threshold $\Delta T_{idle}$.

If the abnormal behavior is detected the step S210 is stopped and the process goes to the step S220. Otherwise, the process maintains the step S210.

In a step S230, via software instructions executed by the electronic control unit A-1100, the hydraulic actuator A-1510 actuates the continuously variable transmission A-1500 to rotate the agitators B-1300 to reach a speed corresponding to the value of the output target speed $W_{out\ target}$ entered in the step S110.

In a step S240, the quick idle process is ended.

In addition, the input unit A-1300 can include indications, e.g., visual icons, light signals, push/release buttons, to communicate to the operator 200 that the quick idle process is initiated and running. For example, the indications can include visual icons, light/sound signals, and/or push/release buttons turned on and/or depressed when the quick idle process is running and turned off and/or released when the quick idle process is ended.

Figure 7:
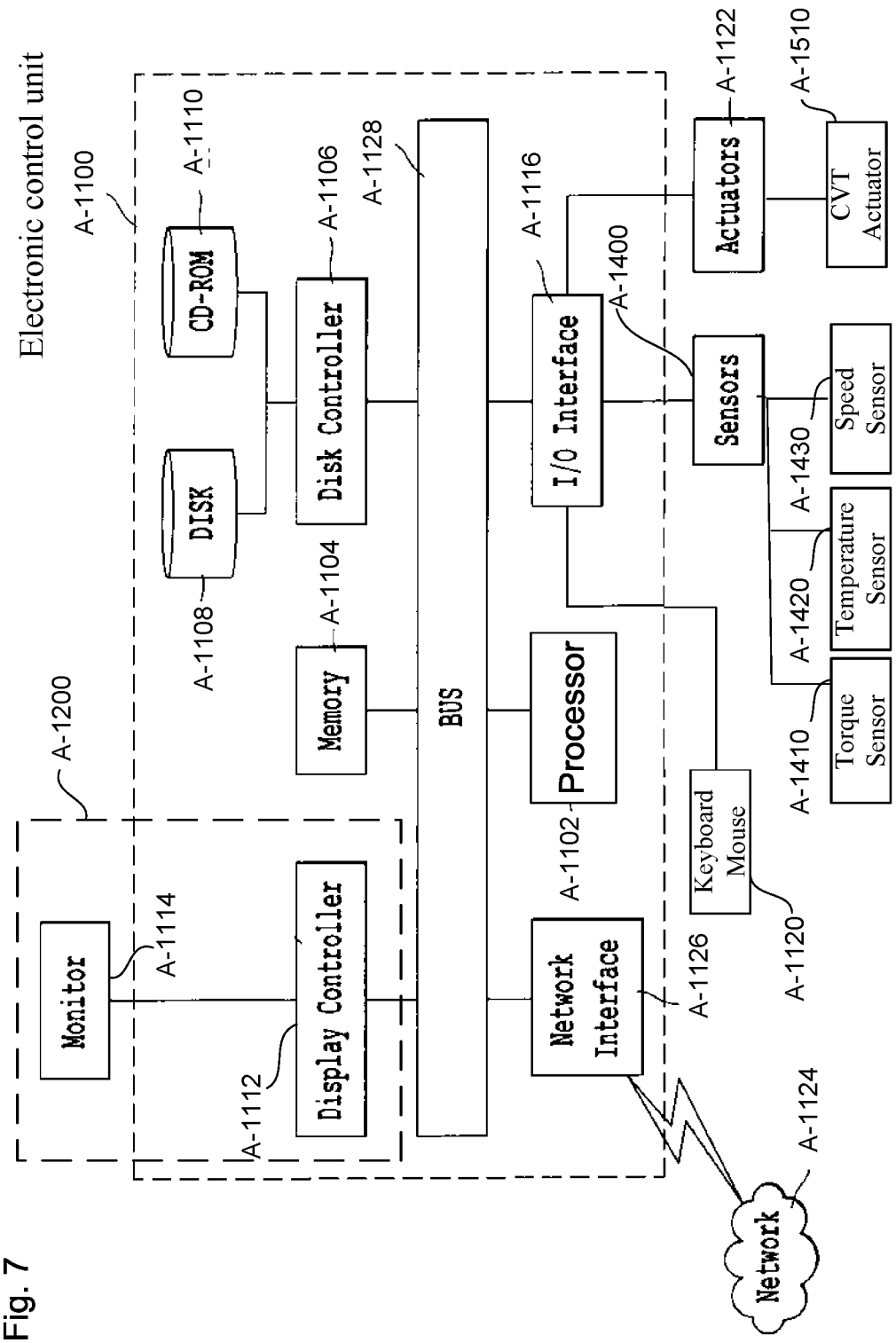
FIG. 7 is a schematic view of a hardware diagram of an electronic control unit for operating the control system, according to certain aspects of the disclosure.

FIG. 7 is a schematic view of a hardware diagram of an electronic control unit A-1100 for operating the control system A-1000, according to certain aspects of the disclosure.

As shown in FIG. 5, systems, operations, and processes in accordance with this disclosure may be implemented using the processor A-1102 or at least one application specific processor (ASP). The processor A-1102 may utilize a computer readable storage medium, such as the memory 1104 (e.g., ROM, EPROM, EEPROM, flash memory, static memory, DRAM, SDRAM, and their equivalents), configured to control the processor A-1102 to perform and/or control the systems, operations, and processes of this disclosure. Other storage mediums may be controlled via a disk controller A-1106, which may control a hard disk drive A-1108 or optical disk drive A-1110.

The processor A-1102 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor A-1102 may be a separate device or a single processing mechanism. Further, this disclosure may benefit form parallel processing capabilities of a multi-cored processor.

In another aspect, results of processing in accordance with this disclosure, e.g., the status bar A-1210, may be displayed via the output unit A-1200. The output unit A-1200 can include a display controller A-1112 that controls a monitor A-1114. The monitor A-1114 may be peripheral to or part of the electronic control unit A-1100. The display controller A-1112 may also include at least one graphic processing unit for improved computational efficiency.

Moreover, the output unit A-1200 and the input unit A-1300 may be merged together by having the monitor A-1114 provided with a touch-sensitive interface to a command/instruction interface.

Additionally, the electronic control unit A-1100 may include an I/O (input/output) interface A-1116, provided for inputting sensor data from the plurality of sensors A-1400, e.g., the torque sensor A-1410, the hydraulic fluid temperature sensor A-1420, and the speed sensor A-1430, a position sensor, a gearbox temperature sensor and for outputting orders to actuators A-1122, e.g., the hydraulic actuator A-1510.

Further, other input devices may be connected to an I/O interface A-1116 as peripherals or as part of the controller A-1100. For example, a keyboard or a pointing device such as a mouse A-1120 may control parameters of the various processes and algorithms of this disclosure, and may be connected to the I/O interface A-1116 to provide additional functionality and configuration options, or to control display characteristics. Actuators A-1122 which may be embodied in any of the elements of the apparatuses described in this disclosure such as the hydraulic actuator A-1510, may also be connected to the I/O interface A-1116.

The above-noted hardware components may be coupled to the network A-1124, such as the Internet or a local intranet, via a network interface A-1126 for the transmission or reception of data, including controllable parameters to a mobile device. A central BUS A-1128 may be provided to connect the above-noted hardware components together, and to provide at least one path for digital communication there between.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A control system for mixing materials for livestock feed, comprising:
   a container which receives the materials;
   agitators which mix the materials in the container;
   a driveline which drives the agitators at an output speed with an output torque;
   a power source which provides an input speed with an input torque;
   a continuously variable transmission that connects the driveline and the power source; and
   an electronic control unit,
   wherein the continuously variable transmission includes a hydraulic actuator for adjusting a speed ratio between the input speed and the output speed,
   wherein the hydraulic actuator includes a pump and a motor mounted onto a hydrostatic loop that circulates a hydraulic fluid and provides a variable flow of the hydraulic fluid,
   wherein the hydraulic actuator adjusts the speed ratio between a minimum speed ratio and a maximum speed ratio by varying the variable flow of the hydraulic fluid between a full negative displacement and a full positive displacement,
   wherein the electronic control unit is configured to, upon starting the agitators, adjust the hydraulic actuator from a first displacement to a second displacement, and
   wherein the first displacement is between 5% and 100% of the full negative displacement.

2. The control system of claim 1, wherein the hydraulic actuator is at the first displacement for a first predetermined period of time such that the driveline and the agitators have reached a constant speed prior to being adjusted to the second displacement.

3. The control system of claim 2, wherein the input speed is measured with a speed sensor.

4. The control system of claim 2, wherein the first predetermined period of time is between 3 and 10 seconds.

5. The control system of claim 1, wherein the second displacement corresponds to a value of the speed ratio corresponding to a target output speed.

6. The control system of claim 1, wherein the hydraulic actuator adjusts the speed ratio from the minimum speed ratio up to a value of the speed ratio corresponding to a target output speed during a second predetermined period of time.

7. The control system of claim 5, wherein the second predetermined period of time is between 0.1 and 100 seconds.

8. The control system of claim 1, wherein the second displacement causes the continuously variable transmission to operate at a first speed ratio which provides a linear relationship between the input torque and the output torque with a slope, when the input torque is below a control input threshold, and
   wherein the second displacement causes the continuously variable transmission to operate at a second speed ratio which provides a corrected linear relationship between the input torque and the output torque with a corrected slope smaller than the slope, when the input torque is above the control input threshold.

* * * * *